(12) United States Patent
Yan et al.

(10) Patent No.: US 11,010,420 B2
(45) Date of Patent: May 18, 2021

(54) METHOD AND APPARATUS FOR DISPLAYING A PICTURE SEARCH RESULT PAGE, DEVICE AND STORAGE MEDIUM

(71) Applicant: BAIDU ONLINE NETWORK TECHNOLOGY (BEIJING) CO., LTD., Beijing (CN)

(72) Inventors: Yongbo Yan, Beijing (CN); Yingwen Li, Beijing (CN); Xiaoli Gu, Beijing (CN); Xiaohui Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 199 days.

(21) Appl. No.: 15/872,921

(22) Filed: Jan. 16, 2018

(65) Prior Publication Data

US 2018/0210888 A1   Jul. 26, 2018

(30) Foreign Application Priority Data

Jan. 20, 2017   (CN) .......................... 201710045582.9

(51) Int. Cl.
| G06F 7/00 | (2006.01) |
| G06F 16/00 | (2019.01) |
| G06F 16/44 | (2019.01) |
| G06F 16/51 | (2019.01) |
| G06F 16/58 | (2019.01) |
| G06F 16/2457 | (2019.01) |
| G06F 16/9038 | (2019.01) |

(52) U.S. Cl.
CPC ...... *G06F 16/447* (2019.01); *G06F 16/24578* (2019.01); *G06F 16/51* (2019.01); *G06F 16/5866* (2019.01); *G06F 16/9038* (2019.01)

(58) Field of Classification Search
None
See application file for complete search history.

(56) References Cited

U.S. PATENT DOCUMENTS

2005/0055639 A1* 3/2005 Fogg ...................... G06Q 10/10
715/262
2014/0324836 A1* 10/2014 Chittar ...................... G06T 7/90
707/722

(Continued)

FOREIGN PATENT DOCUMENTS

| CN | 101809572 A | 8/2010 |
| CN | 103984757 A | 8/2014 |

(Continued)

OTHER PUBLICATIONS

First Office Action and search report from CN app. No. 201710045582.9, dated Sep. 4, 2019, with English translation from Global Dossier.

*Primary Examiner* — Tuan A Pham
(74) *Attorney, Agent, or Firm* — Ladas & Parry, LLP (57) ABSTRACT

The present disclosure provides a method and apparatus for displaying a picture search result page, a device and a storage medium, wherein the method comprises: obtaining a search term input by a user; determining a timeliness event corresponding to the search term; displaying a search result page corresponding to the search term, and increasing a display effect corresponding to the timeliness event on the search result page. The solution of the present disclosure may be applied to enhance the display effect.

6 Claims, 5 Drawing Sheets

(56) References Cited

U.S. PATENT DOCUMENTS

| | | | |
|---|---|---|---|
| 2015/0310130 A1 | 10/2015 | Musuluri | |
| 2016/0132222 A1* | 5/2016 | Yoo | G06F 3/0486 715/763 |
| 2016/0227282 A1* | 8/2016 | Chang | H04N 21/4821 |
| 2017/0185869 A1* | 6/2017 | Dua | G06K 9/52 |
| 2017/0192651 A1* | 7/2017 | Yang | H04L 67/306 |
| 2017/0303005 A1* | 10/2017 | Shen | G11B 27/322 |
| 2017/0351739 A1* | 12/2017 | Zou | G06F 7/08 |
| 2018/0129653 A1* | 5/2018 | Wang | G06F 3/04842 |

FOREIGN PATENT DOCUMENTS

| | | |
|---|---|---|
| CN | 104077391 A | 10/2014 |
| CN | 104125139 A | 10/2014 |
| CN | 105138697 A | 12/2015 |

\* cited by examiner

METHOD AND APPARATUS FOR DISPLAYING A PICTURE SEARCH RESULT PAGE, DEVICE AND STORAGE MEDIUM

CROSS REFERENCE TO RELATED APPLICATION

The present application claims priority to Chinese Patent Application No. 2017100455829, filed on Jan. 20, 2017, with the title of "Method and apparatus for displaying a picture search result page, device and storage medium", the disclosure of which is hereby incorporated herein by reference in its entirety.

FIELD OF THE DISCLOSURE

The present disclosure relates to Internet technologies, and particularly to a method and apparatus for displaying a picture search result page, a device and a storage medium.

BACKGROUND OF THE DISCLOSURE

In the prior art, a user may use a picture search engine to search for pictures, for example, the user inputs a search term "Yiyangqianxi(Jackson Yee)" in a search input box, and then a series of Yiyangqianxi-related pictures are displayed in a search result page.

However, the above display manner can only display pictures themselves and cannot show more content, for example, cannot show recent event information related to "Yiyangqianxi". Therefore, the display effect is undesirable.

SUMMARY OF THE DISCLOSURE

In view of the above, the present disclosure provides a method and apparatus for displaying a picture search result page, a device and a storage medium, which can improve the display effect.

Specific technical solutions are as follows:

A method of displaying a picture search result page, comprising:
 obtaining a search term input by a user;
 determining a timeliness event corresponding to the search term;
 displaying a search result page corresponding to the search term, and increasing a display effect corresponding to the timeliness event on the search result page.

An apparatus for displaying a picture search result page, comprising a first processing unit and a second processing unit;
 the first processing unit is configured to obtain a search term input by a user, determine a timeliness event corresponding to the search term, and send the search term and the timeliness event to the second processing unit;
 the second processing unit is configured to display a search result page corresponding to the search term, and increase a display effect corresponding to the timeliness event on the search result page.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the present disclosure may be employed to, after obtaining the user-input search term, first determine the timeliness event corresponding to the search term, and then increase a display effect corresponding to the timeliness event on the search result page when the search result page corresponding to the search term is displayed. Since the display effect corresponding to the timeliness event is increased on the search result page, the search result page can reflect the timeliness event corresponding to the search term, and the display effect can be enhanced as compared with the prior art.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Figure 1:
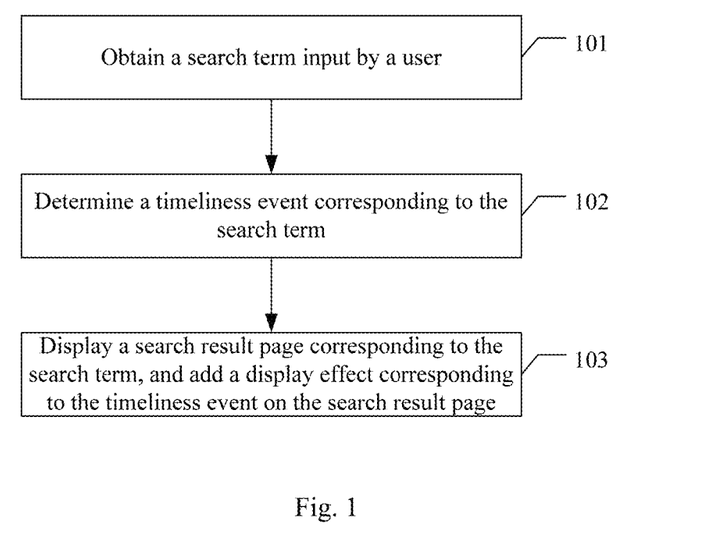
FIG. 1 is a flow chart of a method of displaying a picture search result page according to an embodiment of the present disclosure.

FIG. 1 is a flow chart of a method of displaying a picture search result page according to an embodiment of the present disclosure. As shown in FIG. 1, the embodiment comprises the following specific implementation mode:

In 101, a search term input by a user is obtained.

For example, obtain a search term input by the user in a search input box on a picture search interface.

In 102, a timeliness event corresponding to the search term is determined.

In practical application, it is feasible to obtain event information through a hot spot monitoring platform, for example, crawl a monitoring hot spot in real time from an event source such as NetEase News, Sina News or microblog hot topics, crawl and update once every 10-30 minutes, crawl slugs of top 20 hot events into a repository, classify content in the repository, and, judge hot spot timeliness according to concern for hot spots, hot spot hotness and the like.

Whether an event is a hotspot event may be judged according to timeliness hotspot indices. The indices may comprise: concern for the hotspot, search quantity, article data and commentary data. Specific implementation thereof is of the prior art.

Regarding the search term "Yiyangqianxi" input in 101, it is possible, in the above manner, determine a corresponding hotspot event, namely, a timeliness event, and distinguish a specific type of the timeliness event. The specific types for example may comprise the following types: wishes, blessings, special subjects and the like.

The wishes-type timeliness events may comprise birthday, wedding, and announcement of love affair.

Blessings-type timeliness events may comprise pass-away and the like.

The special subject refers to a hotspot event having event contexts. A set of content of the relevant event constitutes the special subject. How to generate the special subject is of the prior art.

103 relates to displaying a search result page corresponding to the search term, and increasing a display effect corresponding to the timeliness event on the search result page.

It is possible to, upon displaying the search result page corresponding to the search term, increase different display effects on the search result page according to different types of the timeliness events.

How to specifically increase different display effects on the search result page according to the types of the timeliness events may depend on actual needs.

For example, when the type of the timeliness event is a wishes-type event, it is feasible to display a wishes-sending icon corresponding to the content of wishes on the search result page according to the content of wishes, and display a page floating-down effect corresponding to the content of wishes on the search result page when it is determined that the user clicks the wishes-sending icon.

Figure 2:
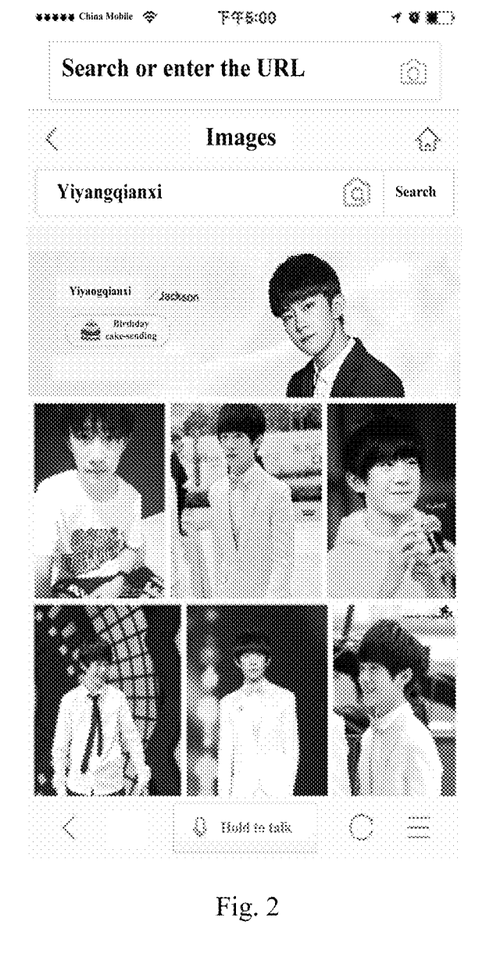
FIG. 2 is a first schematic diagram of a manner of increasing a corresponding display effect on a search result page of a mobile terminal when a timeliness event is birthday according to the present disclosure.

FIG. 2 is a first schematic diagram of a manner of increasing a corresponding display effect on a search result page of a mobile terminal when the timeliness event is birthday according to the present disclosure.

As shown in FIG. 2, assume that the search term input by the user is "Yiyangqianxi", pictures related to Yiyangqianxi may be displayed on the search result page according to the prior art. Different from the prior art, since it is determined that the timeliness event corresponding to Yiyangqianxi is birthday, a birthday cake-sending icon may be further displayed on the search result page. A specific location of the birthday cake-sending icon may depend on actual needs, preferably as shown in FIG. 2.

Figure 3:
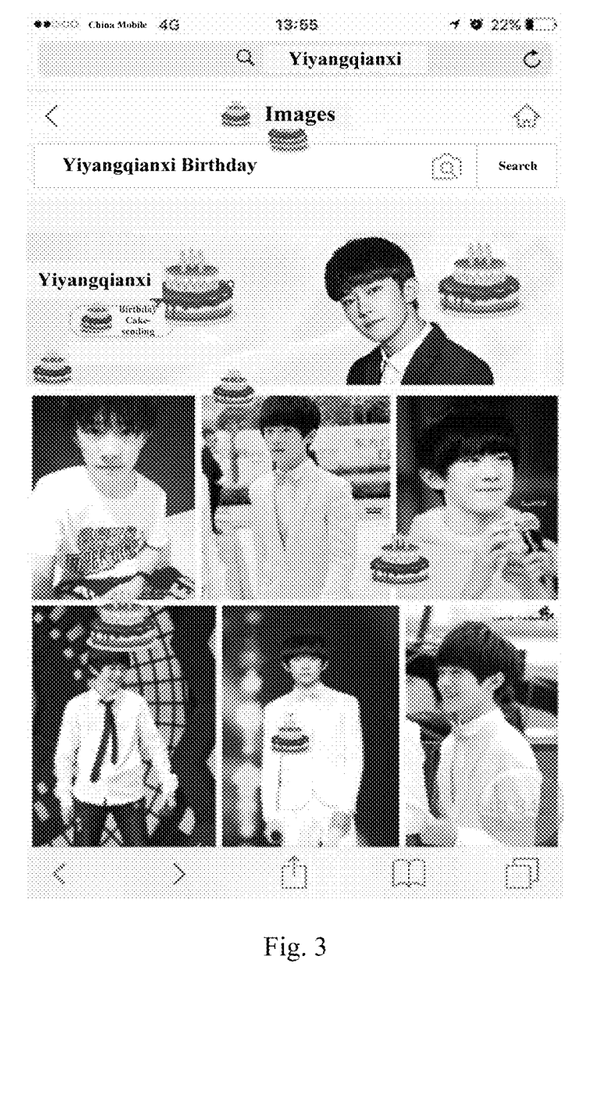
FIG. 3 is a second schematic diagram of a manner of increasing a corresponding display effect on a search result page of a mobile terminal when a timeliness event is birthday according to the present disclosure.

FIG. 3 is a second schematic diagram of a manner of increasing a corresponding display effect on a search result page of a mobile terminal when the timeliness event is birthday according to the present disclosure.

As shown in FIG. 3, after the user clicks the birthday cake-sending icon shown in FIG. 2, a birthday cake floating-down effect may be further displayed on the search result page.

In FIG. 2 and FIG. 3, a mobile terminal is taken as an example for illustration. A terminal other than a mobile terminal such as a PC terminal may also employ the above display manner, namely, displaying the birthday cake-sending icon on the search result page, and further displaying a birthday cake floating-down effect on the search result page after the user clicks the birthday cake-sending icon. However, different types of terminals such as the mobile terminal and PC terminal cause differences in page layout of the search result page. Such differences are of prior art.

In addition, illustration is presented above by taking birthday as an example. Regarding wishes-type timeliness events other than birthday, specific forms of the displayed wishes-sending icons might vary, and floating-down content might vary, for example, fresh flowers or hearts might float down.

When the timeliness event is a blessings-type event, it is feasible to display the search result page as a black-and-white effect, and display a blessing icon on the search result page, and display a colorful candle in the blessing icon as a black-and-white effect when it is determined that the user clicks the blessing icon.

Assume that the search term input by the user is "Qiaorenliang", pictures related to Qiaorenliang may be displayed on the search result page according to the prior art. Different from the prior art, since it is determined that the timeliness event corresponding to Qiaorenliang is pass-away, the search result page may be displayed as a black-and-white effect.

Furthermore, it is further possible to display, in the search result page, a blessing icon which may include a colorful candle pattern. After the user clicks the blessing icon, the pattern becomes a black-and-white effect. The location of the blessing icon may be similar to the location of the birthday cake-sending icon shown in FIG. 2.

When the type of the timeliness event is a special subject, it is feasible to display a special subject entrance on the search result page, and display subject content having event contexts when it is determined that the user clicks the special subject entrance.

Figure 4:
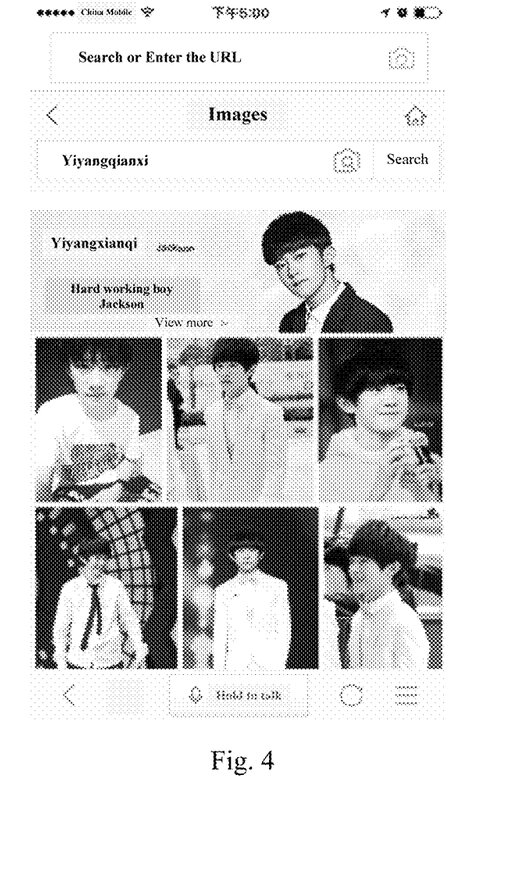
FIG. 4 is a schematic diagram of a manner of increasing a corresponding display effect on a search result page of a mobile terminal when a timeliness event is a special subject according to the present disclosure.

FIG. 4 is a schematic diagram of a manner of increasing a corresponding display effect on a search result page of a mobile terminal when the timeliness event is a special subject according to the present disclosure.

As shown in FIG. 4, assume that the search term input by the user is "Yiyangqianxi", pictures related to Yiyangqianxi may be displayed on the search result page according to the prior art. Different from the prior art, since it is determined that Yiyangqianxi corresponds to subject content having event contexts, a special subject entrance may be displayed on the search result page. A specific form of the special subject entrance is determined according to actual needs, preferably as shown in FIG. 4. After the user clicks "view more", the page will jump to a special subject interface to display the special subject content corresponding to the Yiyangqianxi.

The above display manners are only for exemplary illustration and not intended to limit the technical solutions of the present disclosure. In practical application, it is feasible to preset display manners corresponding to different timeliness events, and then perform display in the corresponding display manners after the timeliness event is determined.

As can be seen from the above introduction, the solution of the present disclosure may be employed to, after obtaining the user-input search term, first determine the timeliness event corresponding to the search term, and then increase a display effect corresponding to the timeliness event on the search result page when the search result page corresponding to the search term is displayed. Since the display effect corresponding to the timeliness event is increased on the search result page, the search result page can reflect the timeliness event corresponding to the search term, and the display effect can be enhanced as compared with the prior art.

The above introduces the method embodiments. The solution of the present disclosure will be further described through an apparatus embodiment.

Figure 5:
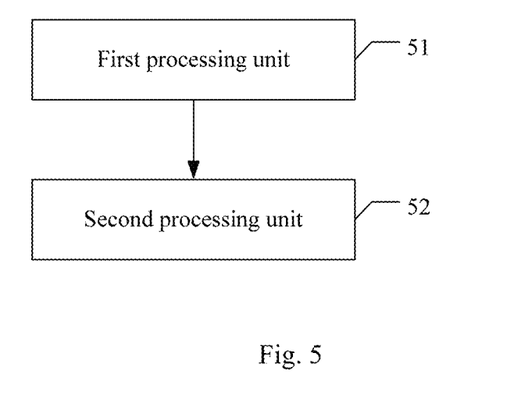
FIG. 5 is a block diagram of an apparatus for displaying a picture search result page according to an embodiment of the present disclosure.

FIG. 5 is a block diagram of an apparatus for displaying a picture search result page according to an embodiment of the present disclosure. As shown in FIG. 5, the apparatus comprises a first processing unit 51 and a second processing unit 52.

The first processing unit 51 is configured to obtain a search term input by a user, determine a timeliness event corresponding to the search term, and send the search term and the timeliness event to the second processing unit 52;

The second processing unit 52 is configured to display a search result page corresponding to the search term, and increase a display effect corresponding to the timeliness event on the search result page.

The first processing unit 51 is configured to obtain the search term input by the user in a search input box on the picture search interface, determine a timeliness event corresponding to the search term, and distinguish a specific type of the timeliness event. The specific types for example may comprise the following types: wishes, blessings, special subjects and the like.

The wishes-type timeliness events may comprise birthday, wedding, and announcement of love affair.

Blessings-type timeliness events may comprise passaway and the like.

The special subject refers to a hotspot event having event contexts. A set of content of the relevant event constitutes the special subject.

The second processing unit 52 is configured to, upon displaying a search result page corresponding to the search term, increase different display effects on the search result page according to different types of timeliness events.

How to specifically increase different display effects on the search result page according to the types of the timeliness events may depend on actual needs.

For example, when the type of the timeliness event is a wishes-type event, the second processing unit 52 may display a wishes-sending icon corresponding to the content of wishes on the search result page according to the content of wishes, and display a page floating-down effect corresponding to the content of wishes on the search result page when it is determined that the user clicks the wishes-sending icon.

When the timeliness event is a blessings-type event, the second processing unit 52 may display the search result page as a black-and-white effect, and display a blessing icon on the search result page, and display a colorful candle in the blessing icon as a black-and-white effect when it is determined that the user clicks the blessing icon.

When the type of the timeliness event is a special subject, the second processing unit 52 may display a special subject entrance on the search result page, and display subject content having event contexts when it is determined that the user clicks the special subject entrance.

Reference may be made to FIG. 2 to FIG. 4 for a specific display manner of the second processing unit 52.

Figure 6:
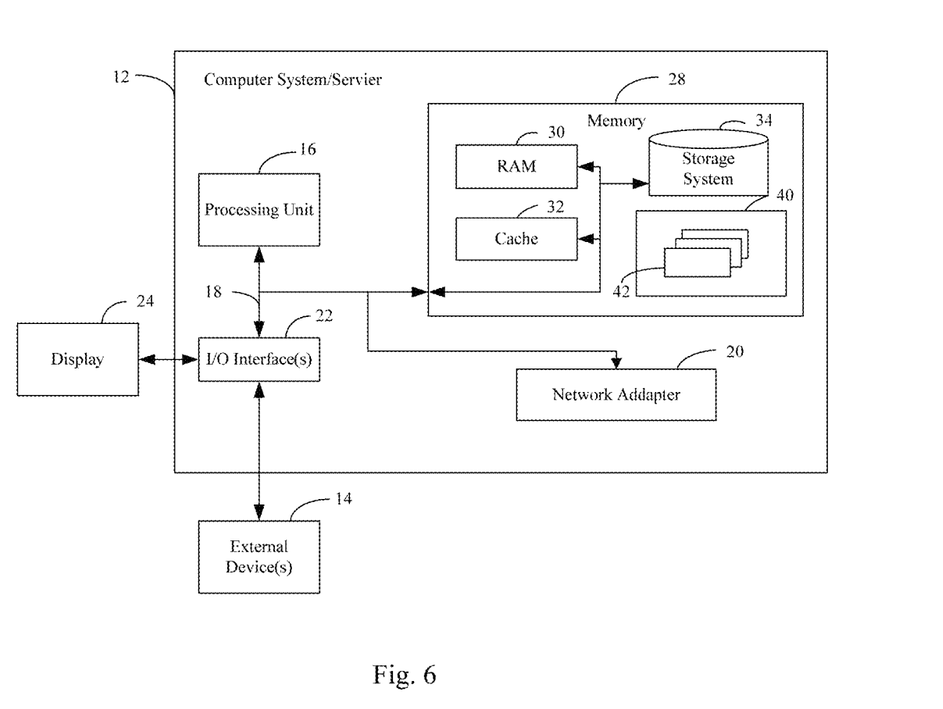
FIG. 6 illustrates a block diagram of an example computer system/server 12 adapted to implement an implementation mode of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, obtain a search term input by a user, determine a timeliness event corresponding to the search term, display a search result page corresponding to the search term, and increase a display effect corresponding to the timeliness event on the search result page.

The types of timeliness events may comprise the following types: wishes, blessings, special subjects and the like.

When the type of the timeliness event is a wishes-type event, it is feasible to display a wishes-sending icon corresponding to the content of wishes on the search result page according to the content of wishes, and display a page floating-down effect corresponding to the content of wishes on the search result page when it is determined that the user clicks the wishes-sending icon.

When the timeliness event is a blessings-type event, it is feasible to display the search result page as a black-and-white effect, and display a blessing icon on the search result page, and display a colorful candle in the blessing icon as a black-and-white effect when it is determined that the user clicks the blessing icon.

When the type of the timeliness event is a special subject, it is feasible to display a special subject entrance on the search result page, and display subject content having event contexts when it is determined that the user clicks the special subject entrance.

The present disclosure further provides a computer-readable storage medium on which a computer program is stored. The program, when executed by a processor, can implement the method in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of displaying a picture search result page, wherein the method comprises:

obtaining, by a terminal, a search term input by a user via a picture search interface;

determining a timeliness event corresponding to the search term, wherein the timeliness event is a hot spot event during a predetermined time period including current time;

displaying to the user, by the terminal, a search result page including a plurality of pictures corresponding to the search term, and adding a display effect including an icon corresponding to the timeliness event on the search result page independent from the plurality of pictures, wherein when the timeliness event is a wishes-type event, displaying a wishes-sending icon corresponding to the content of wishes on the search result page, and displaying a page floating-down effect corresponding to the content of wishes on the search result page when the wishes-sending icon is clicked.

2. The method according to claim 1, wherein
when the type of the timeliness event is a blessings-type event, displaying the search result page as a black-and-white effect, and
displaying a blessing icon on the search result page, and displaying a colorful candle in the blessing icon as a black-and-white effect when it is determined that the user clicks the blessing icon.

3. A computer device, comprising one or more processors;
a memory storing instructions, which when executed by the at least one processor, cause the at least one processor to perform the following operations:
obtaining a search term input by a user via a picture search interface;
determining a timeliness event corresponding to the search term, wherein the timeliness event is a hot spot event during a predetermined time period including current time;
displaying to the user a search result page including a plurality of pictures corresponding to the search term, and adding a display effect including an icon corresponding to the timeliness event on the search result page independent from the plurality of pictures, and wherein when the icon is clicked, wherein when the timeliness event is a wishes-type event, displaying a wishes-sending icon corresponding to the content of wishes on the search result page, and displaying a page floating-down effect corresponding to the content of wishes on the search result page when the wishes-sending icon is clicked.

4. The computer device according to claim 3, wherein
when the type of the timeliness event is a blessings-type event, displaying the search result page as a black-and-white effect, and
displaying a blessing icon on the search result page, and displaying a colorful candle in the blessing icon as a black-and-white effect when it is determined that the user clicks the blessing icon.

5. A non-transitory computer-readable storage medium on which a computer program is stored, wherein the program, when executed by the processor, implements the following operations:
obtaining a search term input by a user via a picture search interface;
determining a timeliness event corresponding to the search term, wherein the timeliness event is a hot spot event during a predetermined time period including current time;
displaying to the user a search result page including a plurality of pictures corresponding to the search term, and adding a display effect including an icon corresponding to the timeliness event on the search result page independent from the plurality of pictures, and wherein when the icon is clicked, wherein when the timeliness event is a wishes-type event, displaying a wishes-sending icon corresponding to the content of wishes on the search result page, and displaying a page floating-down effect corresponding to the content of wishes on the search result page when the wishes-sending icon is clicked.

6. The non-transitory computer-readable storage medium according to claim 5, wherein
when the type of the timeliness event is a blessings-type event, displaying the search result page as a black-and-white effect, and
displaying a blessing icon on the search result page, and displaying a colorful candle in the blessing icon as a black-and-white effect when it is determined that the user clicks the blessing icon.

\* \* \* \* \*